Aug. 24, 1937.　　　T. H. HALLWOOD　　　2,091,041
BREAD TOASTER
Original Filed April 13, 1935　　5 Sheets-Sheet 1

Inventor
Thomas H. Hallwood
By W. S. M. Powell.
Attorney

Aug. 24, 1937.  T. H. HALLWOOD  2,091,041
BREAD TOASTER
Original Filed April 13, 1935   5 Sheets-Sheet 3

Inventor
Thomas H. Hallwood
By W. S. M. Howell
Attorney

Aug. 24, 1937.  T. H. HALLWOOD  2,091,041
BREAD TOASTER
Original Filed April 13, 1935   5 Sheets-Sheet 5

Inventor
Thomas H Hallwood
By W. S. McDowell
Attorney

Patented Aug. 24, 1937

2,091,041

UNITED STATES PATENT OFFICE 2,091,041

BREAD TOASTER

Thomas H. Hallwood, Russells Point, Ohio

Application April 13, 1935, Serial No. 16,227
Renewed January 21, 1937

16 Claims. (Cl. 53—5)

This invention relates to bread toasting apparatus and more particularly to the type of toaster referred to in my co-pending application, Serial No. 674,864 filed June 8, 1933, of which this application is a continuation-in-part.

The main object of this invention is the provision of a device that will toast slices of bread on both sides simultaneously and after a certain predetermined period of time, automatically reduce the gas supply enough to discontinue the toasting operation and still maintain the device at a temperature sufficient to eliminate the time period required for preliminary heating.

A second object rests in the provision of a toaster in which bread may be positioned for toasting and after a predetermined period of time elevated to a position where it may be conveniently and easily removed from the toaster for use.

Another object is to provide a device of this character which will require a minimum amount of attention or service and one which will be economical in its operation.

A further object is the provision of novel means for lowering the bread to be toasted substantially vertically into the toaster and to operate a valve to increase the flow of gas to the burner mechanism to raise the temperature in the toasting zone to toast the bread uniformly and in a relatively limited period of time.

A still further object resides in the employment of a valve which is provided with a diaphragm instead of the usual packing to prevent leakage and to arrange the valve in such a position that it will be operated by the final stage of downward movement of the toast supporting mechanism.

Another object is the provision of a connection between certain levers of the mechanism which will permit the toast carrier to be elevated to its upper position for the removal of the toast at any desired time prior to the termination of the predetermined time period.

Still another object lies in the provision of a machine of this type which will toast bread and after a predetermined period of time cut down the gas supply and retain the toast in toasting position to keep it warm and fresh until used.

For a further understanding of the invention, reference may be made to the following description and the accompanying drawings forming a part of this application and in which there has been shown one form of the invention.

Referring more particularly to the drawings, the numeral 1 designates the toaster in its entirety which is formed to include a base member 2 preferably of cast metal and which forms the foundation of the machine. The under side of the base member 2 is provided with feet 2a which support the weight of the machine. Cast integrally with the base member 2 on its upper surface are a plurality of lugs 3 arranged near the outer periphery on both sides and at the back. A vertical inner wall 4 is secured to the lugs 3 by screws or the like 5, which wall forms the support for the lever mechanism 6 of the machine. This wall surrounds the mechanism on three sides and slightly spaced from the front of the machine is a partition wall 7 which forms the fourth side of the inner wall and serves to divide the toaster into two chambers. The front chamber constitutes the timing mechanism chamber while the latter forms the toasting chamber. The wall 7, together with a short plate 8 slightly spaced therefrom, serves to insulate the timing chamber against heat from the toasting zone. An outer housing 9 formed with a flange 10 near its bottom edge completes the side walls of the toaster. The housing 9 is formed of sheet metal and may be suitably finished either by polishing, enameling or painting, according to the desires of the manufacturer. A space 11 is maintained between the outer wall 9 and the inner walls 4 to provide for the passage of air therethrough to carry away the heat and prevent the housing 9 from becoming too warm. The base 2 is formed open in the center and the inner edge is inclined outwardly to form a space around the bottom edge of the walls 4 to permit cool air from beneath the toaster to enter the space 11. A top or cover section 12 preferably of cast metal completes the housing. This section may be suitably finished to harmonize with the finish on the rest of the toaster. The top is supported by the upper edge of the outer wall 9 and is spaced from the wall 4 to permit warm air which rises in the space 11 to pass upwardly and out through openings 13 formed in the top section 12. The openings 13 provide for the insertion of the bread to be toasted into the toasting chamber.

Secured in spaced relation from the rear end of the wall 4 is a short plate identical with the plate 8. These plates each have a shelf 14 formed with their lower edge for the support of a burner 15 which is held in place by screws passing through webs formed with the burner and the shelves.

The burner 15 is formed to include a plurality of longitudinally extending tubes 16 connected at their central portions by a transversely extending distributor manifold 17. An air mixing tube 18 extending substantially parallel to the tubes 16 connects with the central portion of the manifold 17. This mixing tube is of the Venturi type and the inlet end communicates with a gas conducting tube 19 leading from the gas controlling valve 20. The tube 19 is T-shaped and the cross member 19' of the T is arranged in alignment with the mixing tube 18. The end of the tube 19' communicating with the mixing tube 18 is provided with a spud 21 having an orifice 22 formed therein. The size of this orifice may be varied by the adjustment of a needle valve 23 which is accessible from the opposite end of the member 19'. A cap 24 threaded on the outer end of the member 19' protects the needle valve from accidental displacement and can be readily removed when it is necessary to adjust the valve.

To control the supply of air drawn into the mixing tube 18, a circular plate 25, threaded on the member 19', is arranged to cover the flared open end of the mixing tube 18. By turning the plate 25, it may be moved toward or away from the end of the mixer and in this way control the amount of air entering thereinto. A lock nut 26 is provided to hold the plate 25 in its various positions of adjustment. Access to this adjustable plate may be had through an opening 9a in the back of the housing 9.

The gas controlling valve 20, with which the tube 19 communicates, comprises a body casting 27 and a clamping ring 28. The body 27 is substantially circular when viewed in plan and is formed centrally with a boss 29 on its upper surface which surface is depressed or dished to provide a chamber 30, and has a finished annular boss 31 formed around its outer edge. A circular flexible metal diaphragm 32 is clamped against the boss 31 by the ring 28 and serves to close the open side of the chamber 30 formed in the upper surface.

The vertical portion of the T-shaped tube 19 is formed by an upstanding boss 33 in which is provided a bore 34 connected with the chamber 30 by a port 35. The under side of the body 27 is provided with a central boss 36 in which is formed a bore 37 in alignment with the boss 29. A valve seat 38 is provided near the upper end of the bore 37 and a valve member 39 cooperates with the seat 38 to control the passage of gas therethrough. Above the valve 39, the bore 37 is connected by means of angular ports 40 with the chamber 30. The lower end of the bore 39 is closed by a plug 41 and a spring 42 is positioned between the upper end of the plug 41 and the valve 39 to move the latter toward the seat 38. The upper side of the valve 39 includes a guide stem 43 which passes through a bore formed in the boss 29 and engages the under side of the diaphragm 32.

It will readily be seen that if pressure is applied to the upper side of the diaphragm, the valve will be moved downward against the spring 42 and away from the seat 38, permitting gas to flow from the bore 37 into the chamber 30 by way of the ports 40 and from there it will flow through the port 35, through the tube 19, and into the mixing tube 18.

To conduct the gas to the bore 37, an angular bore 44 is formed in one of the side walls of the boss 36 and an elbow 45 is threaded thereinto. A gas supply pipe 46 leading from a suitable source of supply is connected with the elbow 45. An operating member 47 for the controlling valve 20 is hinged to the clamping ring at the rear of the valve and passes across the valve and between a pair of guides 48 formed on the ring. The outer end of the member 47 is provided with a hardened wear receiving button 49. A pressure disk 50 is formed on the member 47 in registration with the center of the diaphragm and the valve stem 43. The spring 42 possesses sufficient strength to move the valve to a closed position against the weight of the operating member 47.

The upper surface of each of the tubes 16 of the burner 15 includes a centrally positioned boss 51 extending longitudinally of the tube. Vertical ports 52 are drilled through the bosses and into the tubes to permit the gas to issue therefrom for combustion. The tubes 16 further include lugs 53 which serve, together with the bosses 51, to position and support the lower ends of radiant walls 54. The walls are further supported at their upper edges by channel bars 55 connected with the plates 8 at each end of the burner. The walls 54 are formed of a suitable fire clay used in making radiants and have their front faces provided with tips which become incandescent when contacted by the flame. The walls incline from the vertical slightly toward the ports 52 so that flame issuing from the burner will come in contact with the walls and be guided thereby to the full height of the wall.

In the form of burner shown, as in the application above referred to, there has been provided four rows of ports 52. The two outer rows are spaced a greater distance from the inner rows than the two inner rows are from each other, to provide the toasting zones 56. Positioned in each toasting zone is a longitudinally extending inverted channel strip 57 provided with vertically extending wires 58. These wires form guides and support the bread in a vertical position in the toasting zone between the spaced walls and rows of ports. To enable the strips 57 to move vertically, they are secured to vertical posts formed on a transversely extending bar 60. The bar 60 together with the strips 57 form the toast carrier. The outer ends of the bar 60 are equipped with arms 61 with which are provided vertically spaced pivots 62. Secured to the arms by means of the pivots is a secondary lever mechanism 63.

To move the toast carrier substantially vertically, this lever mechanism, which forms the sole support for the toast carrier, comprises a pair of vertically spaced levers 64 fulcrumed to the inner wall 4. The fulcrums of the levers as well as the pivots on the arms 61 are in vertical registration to form a parallelogram. It may be seen that when the outer ends of the levers 64 are moved, the arms 61 will remain in a true vertical position. The upper lever 64 is formed with an extension 65 on its fulcrumed end to which a spring or springs 66 are attached to hold the outer ends of the levers and the toast carrier in a bread receiving position. The lower ends of the springs 66 are secured to bosses formed with the base 2.

Figure 8:
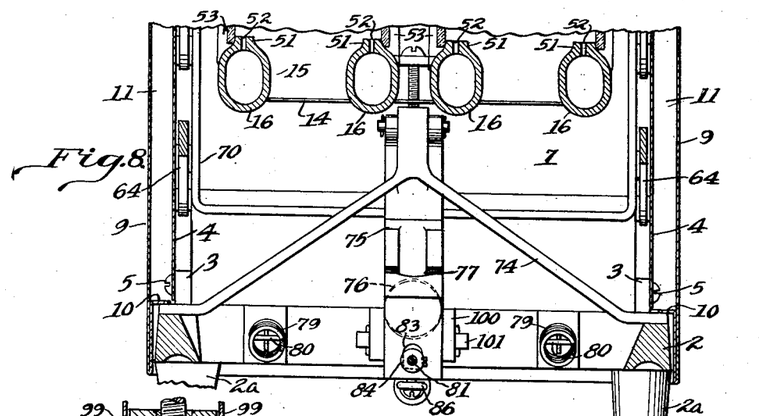
Fig. 8 is a detail vertical transverse sectional view taken on the plane indicated by the line VIII—VIII of Fig. 3.
Figure 9:
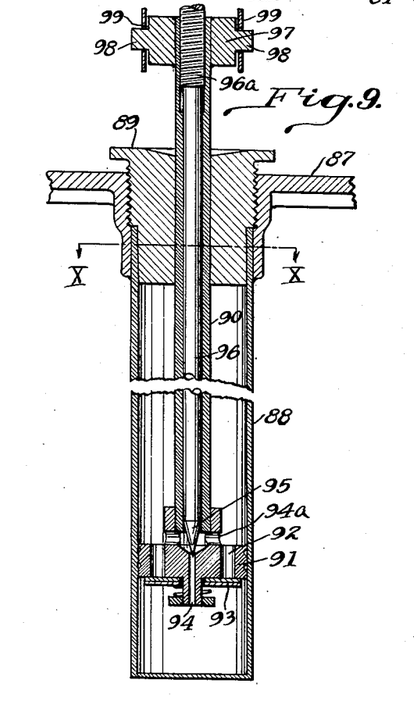
Fig. 9 is a vertical transverse sectional view of the time controlling member used in the toaster, the plane of the section being indicated by the line IX—IX of Fig. 3.
Figure 10:
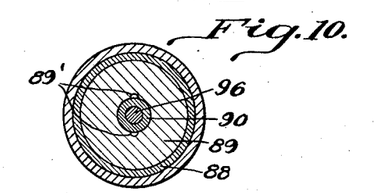
Fig. 10 is a horizontal section taken on the line X—X of Fig. 9.

In order to move the toast carrier downward against the action of the springs 66, a main lever 67 is fulcrumed to the wall 4 near the rear end of the toaster. The outer end of the lever 67 is provided with a handle 68 extending outwardly through an elongated opening 69 in the front of the housing 9, the handle 68 being grasped and pressed down manually when the machine is operated. To transfer this downward movement to the secondary lever mechanism and toast carrier, a link member 70 of U-form as shown in Fig. 8 is pivoted to the lower of the levers 64. The upper ends of the link are provided with shoulders 71 which lie under pins 72 carried by the lever 67. The link 70 is formed with vertically extending guides to one side of the shoulders 71 and the cross bar of the U is weighted as at 73 to hold the guides against the pins 72. When the lever 67 is moved downward, the pins 72 will engage the shoulders 71 and force the lever 64 down also. To hold the toast carrier down, so that the bread will toast, the base 2 is equipped with a bar 74 raised in the center and formed with an upstanding boss to which is pivoted for free swinging movement a latch member 75. This latch member is weighted on the front side as at 76 so that it will swing toward the cross bar 60. The rear face of the latch is provided with a shoulder 77 arranged to overlie the cross bar 60 when it is moved to its lowest position and prevent its upward movement until the latch is again moved to a point where the shoulder 77 does not engage the bar 60.

The inner ends of the main lever 67 are bent downward to form legs 67a and the lower ends of the legs 67a pivotally support a spring connecting yoke 78. The yoke 78 is formed with openings which receive the end loops of a pair of main springs 79 which are connected at their forward ends with screw eyes 80 threaded into bosses formed on the front wall of the base 2. The screw eyes may be adjusted to vary the tension on the springs 79. The force exerted by these springs moves the lever 67 upward after it has been pushed down. The link 70 due to its formation at the upper end permits the lever 67 to move upwardly even though the secondary lever mechanism is held down by the latch 75.

The yoke 78 is provided at its central portion with a bore into which is threaded a latch release rod 81. A lock nut 82 holds this rod in its various positions of adjustment. The opposite end of the rod 81 is received within an opening 83 formed in the lower portion of the latch 75. A short sleeve 84 is secured to the outer portion of the rod 81 and as the lever 67 is moved upward by the springs, the yoke 78 will move forward carrying the rod 81 with it so that the sleeve 84 will engage the latch and swing it forward against the force of the weight 76. This movement will release the bar 60 and permit the toast carrier and secondary lever to rise to their normal positions. The sleeve 84 is placed on the rod 81 in such a position that the latch will not be released from engagement with the toast carrier until the main lever 67 has returned almost to its normal elevated position. If it is desired to release the toast carrier prior to this time, the operator may pull on a knob 85 which is connected by a rod 86 with the lower end of the latch 75. When this is done, the toast carrier will be released and the weight 76 will engage the cross bar of the U-shaped link 70 and swing the shoulders 71 to one side of the pins 72 so that the secondary lever can move to its normal position. When the lever 67 reaches its normal position, the counter-weight 73 will move the shoulders under the pins 72 again and the machine will be in working order once more.

To control the return of the lever 67 to its normal elevated position and thereby regulate the length of the toasting period, the lever near its forward end is provided with a transversely extending saddle 87. Secured to this saddle is a cylindrical cup 88 which is closed at its lower end and contains oil or other suitable fluid. The upper end of the cup 88 is closed by a plug 89 which forms a guide for a piston stem 90 to the bottom of which is attached a piston 91. The guide is provided with longitudinal grooves 89' through which oil which works its way out may drain back into the cylinder. The piston 91 is formed with a plurality of vertical ports 92 which are closed by a flat, spring pressed valve 93. As the piston is moved upward, the fluid may pass freely through the ports 92 but when the movement is reversed, the valve 93 closes and the fluid below the piston must pass from the under side of the piston to the upper side thereof through a central port 94 and horizontal port 94a. The port 94 is of reduced diameter and the flow of fluid is further resisted by a needle valve 95 formed on the valve rod 96 which is positioned in the stem 90. The valve rod 96 is provided at its upper end with threads 96a by which the valve 95 may be opened or closed. The upper end of the rod 96 extends through an opening in the cover 12 and is provided with a control arm by which the valve can be adjusted from the exterior of the machine to control the length of the toasting period. The upper end of the piston stem 90 is secured to a head 97 formed with fulcrum pins 98 which are received in bearings 99 carried by the upper end of a piston support 100.

Figure 1:
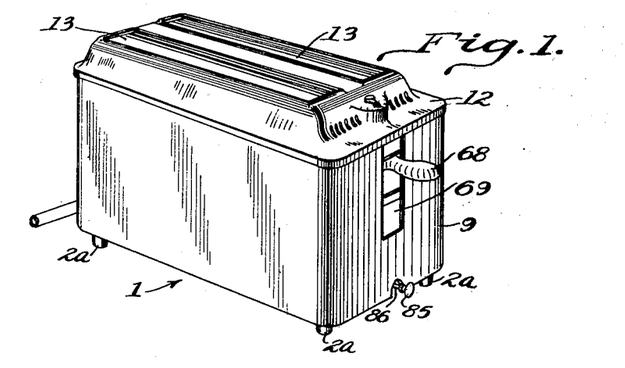
Fig. 1 is a perspective view of a toaster constructed in accordance with the present invention.
Figure 2:
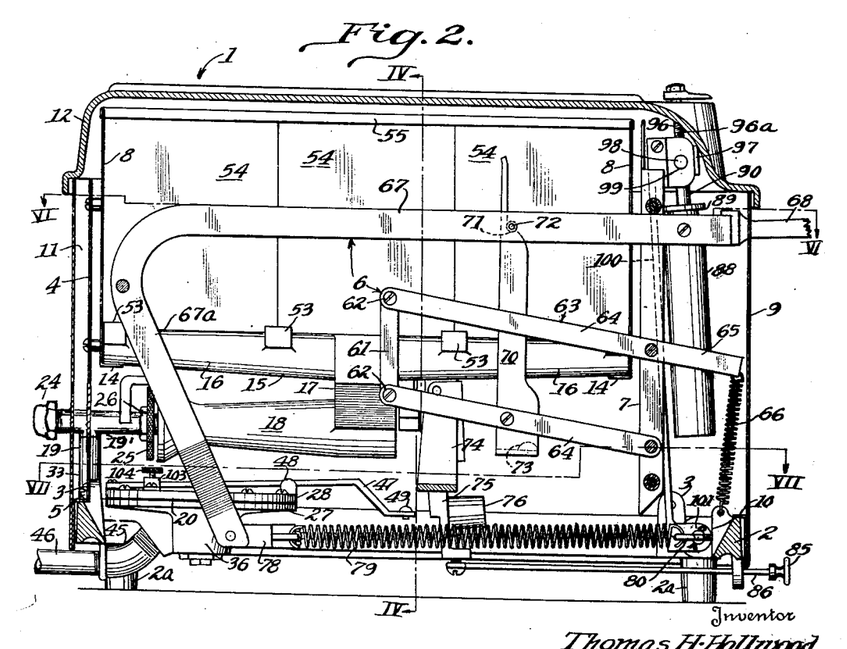
Fig. 2 is a vertical longitudinal sectional view taken through the toaster and showing the internal mechanism in side elevation.
Figure 3:
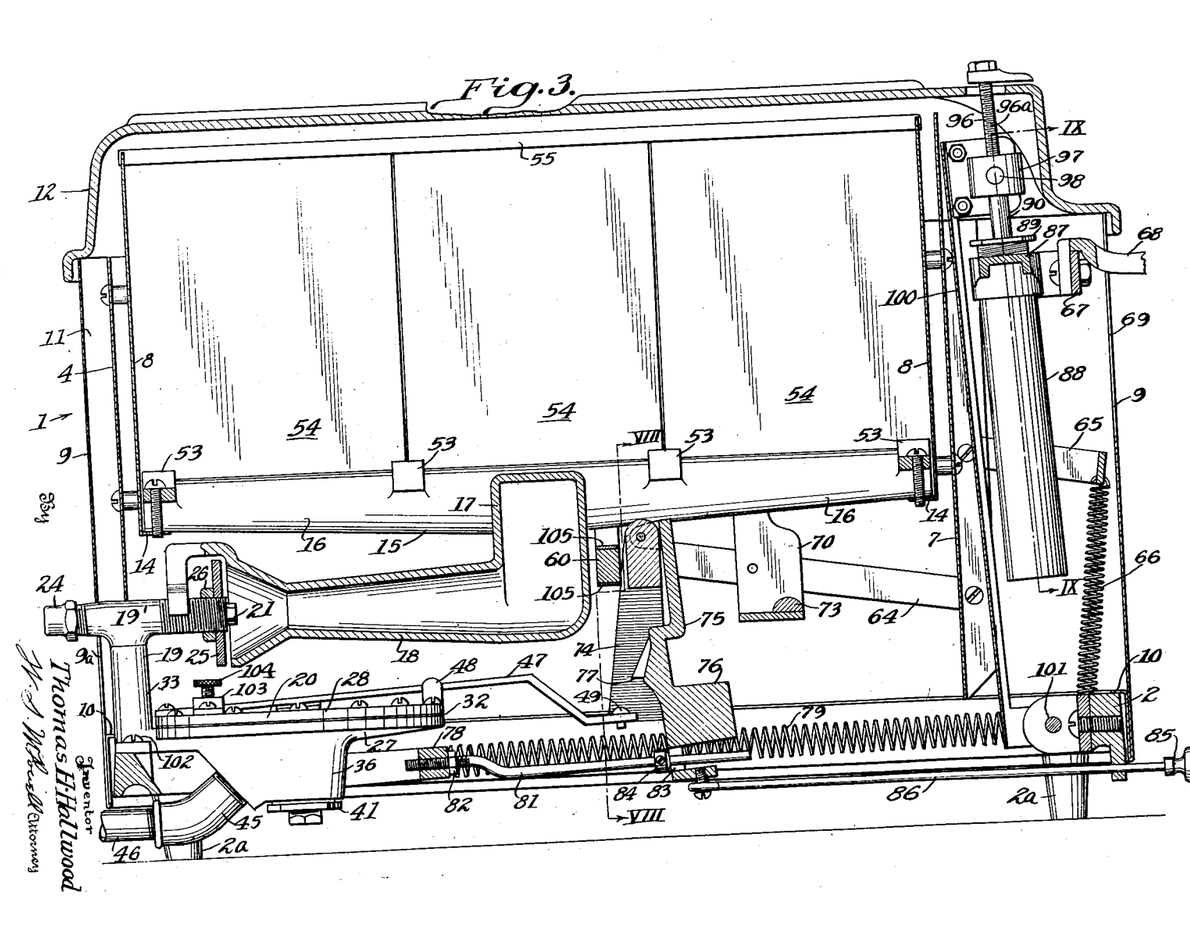
Fig. 3 is an enlarged vertical longitudinal sectional view taken through the center of the toaster and shows the mixing tube of the burner in section.
Figure 4:
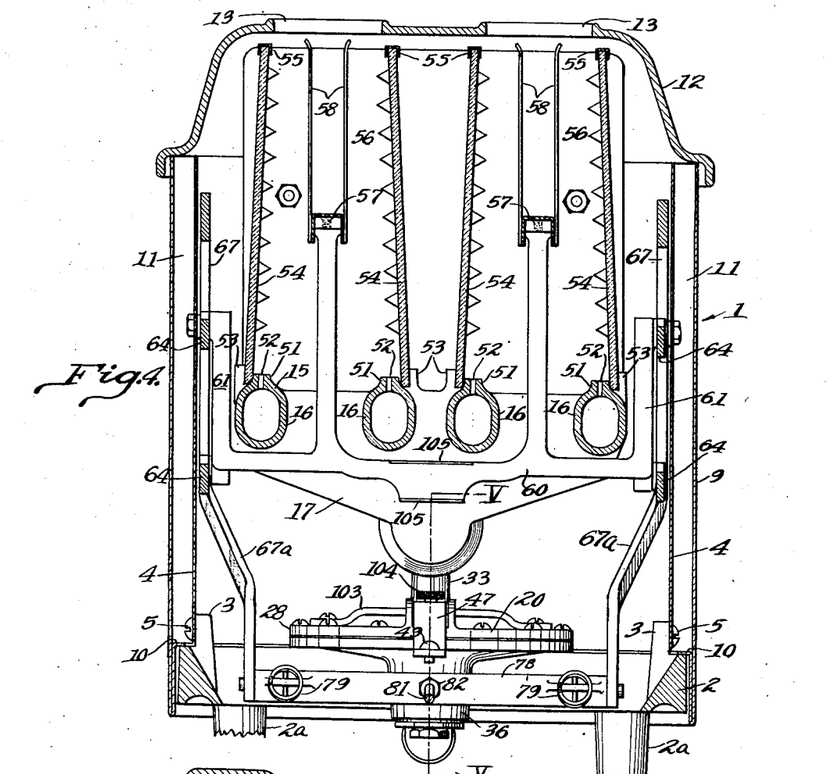
Fig. 4 is a vertical transverse sectional view taken on the plane indicated by the line IV—IV of Fig. 2.
Figure 5:
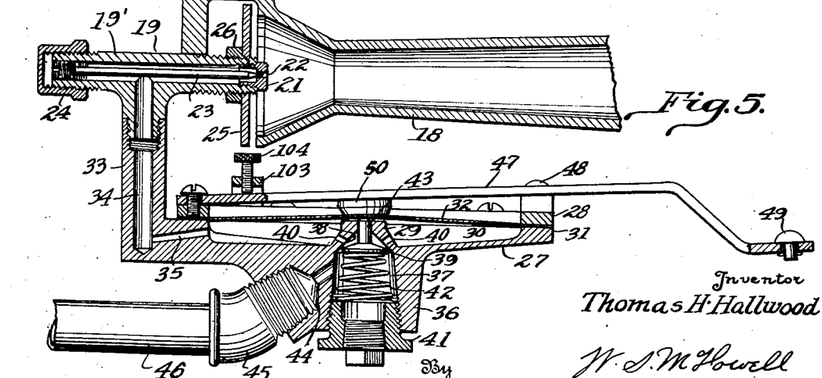
Fig. 5 is a detail vertical sectional view of the valve and mixing tube associated therewith, the plane of the section being indicated by the line V—V of Fig. 4.
Figure 6:
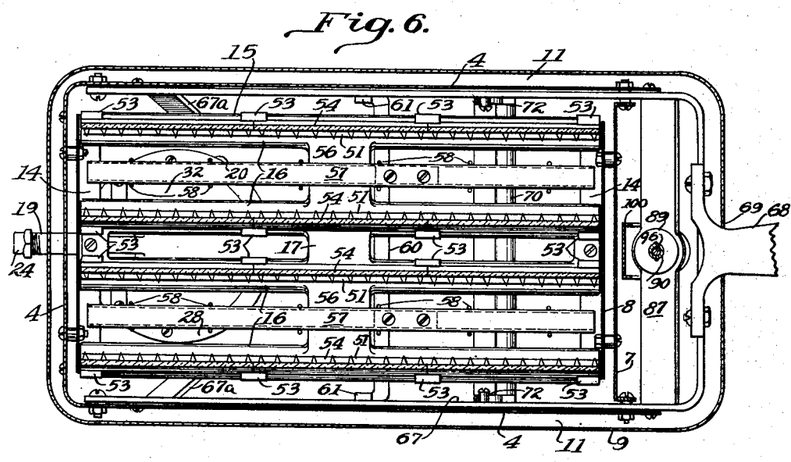
Fig. 6 is a horizontal sectional view taken on the plane indicated by the line VI—VI of Fig. 2.
Figure 7:
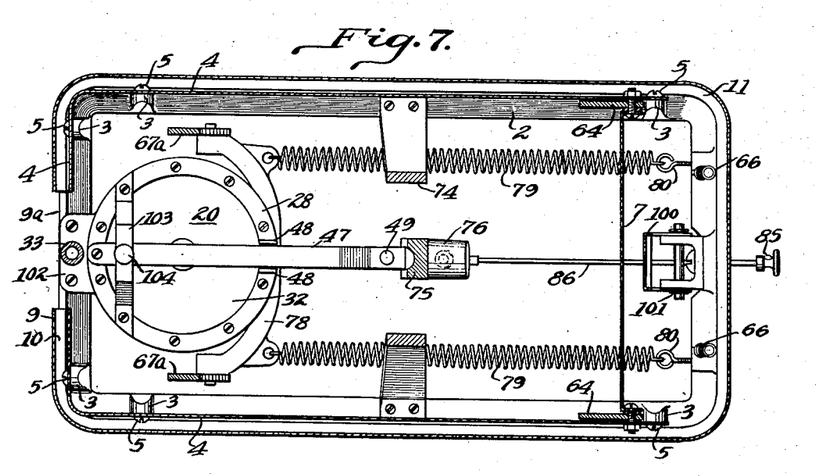
Fig. 7 is a similar view on the plane indicated by the line VII—VII of Fig. 2.

The piston support is pivotally secured to the base 2 as at 101 so that the upper free end, to which the piston is attached, may rock to find its own center which will enable the piston to move in the cylinder with the least amount of friction. It will be noted upon inspection of Fig. 3 that the center of the pivot 101 for the support 100 is not in true vertical registration with the center of the pivot for the head 97. The reason for this off-center mounting is because virtually all the travel of the lever 67 at the point where the saddle is pivoted thereto is above the fulcrum for the lever. A plane passing through the fulcrum for the lever and the pivot for the saddle when the lever is at the mid-point of its movement, will be at right angles to a plane passing through the pivot 101 for the support 100.

The gas controlling valve 20 is supported in position and secured to the base by screws 102 which pass through a boss formed on the rear of the valve body 27.

In order to maintain the radiant walls 54 in a heated condition to make pre-heating unnecessary, the gas controlling valve is held slightly open to permit a small amount of gas to pass through to the burner. To hold the valve open, a strip of metal 103 arched in the center is attached to the upper surface of the clamping ring. This strip passes over the operating member 47 and in registration with it is provided with a screw 104. By adjusting this screw, pressure may be applied on the operating member to open the valve the desired amount.

The outer end of the operating member 47 is positioned in the path of movement of the cross bar 60 so that when the toast carrier is lowered, the bar 60 will engage the button 49 provided on the operating member 47, moving it downward and opening the valve. As a slight downward movement on the part of the member 47 will completely open the valve, the bar 60 of the toast carrier does not engage with the operating member until the toast carrier has just about reached its lowest position.

The bar 60 is provided with wear resisting plates 105 on top and bottom where it is engaged by the latch and the valve operating member.

The operation of the device is as follows: The bread to be toasted is placed in the toast carrier between the guide wires 58, through the openings 13, and the handle 68 depressed. This will move the toast carrier down into the toasting position and completely open the gas supply valve. The latch member will hold the carrier down in this position and the valve will be held open. The main springs will cause the main lever to move upward again but this upward movement will be slow, due to the timing device which comprises the oil cylinder and piston. When the lever has almost reached its normal elevated position, the sleeve on the latch release rod engages the latch and continued movement of the main lever disengages the latch from the toast carrier, permitting it to rise and the gas valve to close. The toast may then be removed and used.

Figure 11:
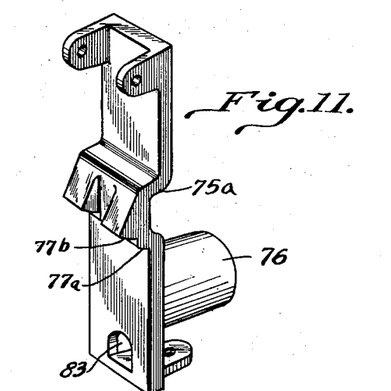
Fig. 11 is a perspective view of a modified form of latch employed when it is desired to retain the toast in the oven to keep it warm.

Fig. 11 shows a modified form of latch 75a. This latch is quite similar to the preferred form of latch. Instead of the single shoulder 77, the latch 75a is formed with a pair of stepped shoulders 77a and 77b. When this type of latch is employed, the sleeve 84 is adjusted so that when the main lever reaches its normal position, the latch will be swung away from the bar 60 just far enough to permit the bar to move upwardly from the lower shoulder 77a to the upper shoulder 77b. This upward movement is sufficient to allow the valve operating member to raise and the valve to cut down the gas flow so that the flame will be lowered. The engagement of the bar 60 with the upper shoulder 77b of the latch holds the toast carrier in the lowered position and the toast will be kept warm by the heat retained in the radiant walls. When it is desired to use the toast, the knob 85 is pulled and the toast carrier will raise and the toast can be removed. If desired, a warning signal in the form of a bell or a flag may be employed to notify the operator that the toasting operation is completed although the position of the operating handle in its slot is sufficient indication.

Although I have shown and described what I believe to be the preferred form of my invention, nevertheless it will be understood that many changes may be made in the mechanical construction of the device without departing from the spirit and scope of the invention as defined in the following claims.

What is claimed is:

1. In a gas toaster, a support, a main lever pivoted at its inner end to said support, a secondary lever mechanism including a pair of superposed levers pivoted near the opposite end of said support, a toast carrier pivoted to the free ends of said pair of levers, and means for connecting the intermediate portion of said secondary lever mechanism with said main lever to impart movement to said toast carrier.

2. In a gas toaster, a support, a main lever pivoted at one end to said support, resilient means for holding said main lever in a normal position, a secondary lever mechanism pivoted to said support, said lever mechanism including a pair of levers having their pivots arranged in vertical registration, a toast carrier pivoted to the free ends of said pair of levers, and means for connecting the intermediate portion of one of said pair of levers with said main lever to impart movement to said toast carrier, said means providing for the return of said main lever to a normal position independently of said secondary lever mechanism.

3. In a gas toaster, a support, a main lever pivoted to said support, spring means for moving said lever to a raised position, a secondary lever mechanism pivoted at one end to said support, a toast carrier supported by the opposite end of said secondary lever mechanism, spring means for moving said secondary lever and toast carrier to an elevated position, latch means for holding said carrier and secondary lever against the action of said spring means, manual means for releasing said latch means, and motion transmitting means arranged between said main and secondary levers, said means permitting said main lever to return to its normal position while said secondary lever is held by said latch.

4. In a gas toaster, a base, a burner mechanism supported above said base, a spring elevated bread carrier arranged for vertical movement above said burner mechanism, a lever mechanism for lowering said carrier, a gas controlling valve arranged below said burner mechanism and actuated to an open position by said carrier when it is moved to its lowered position, means for holding said carrier in its lowered position, said means comprising a pivoted latch formed with a plurality of stepped shoulders for engagement with said bread carrier, and means actuated by said lever mechanism for moving said latch to shift its engagement with said bread carrier from the lower to the upper shoulder.

5. In a gas toaster, a base, a burner mechanism supported above said base, a spring elevated carrier arranged for vertical movement above said burner mechanism, a lever mechanism for lowering said carrier, a gas controlling valve arranged below said burner mechanism, means for holding said valve in a partially open position, an operating member for said valve arranged to fully open said valve when moved by said bread carrier, and latch means carried by said base for holding said carrier in engagement with said operating member.

6. In a gas toaster, a support, a burner mechanism carried by said support, a plurality of vertically extending radiant elements supported in spaced relation above said burner mechanism, a spring elevated bread carrier arranged for vertical movement between said radiant elements, a main lever pivoted to said support, spring means for holding said main lever in an elevated position, a secondary lever mechanism for transferring downward motion of said main lever to said toast carrier, a gas controlling valve for said burner mechanism, an operating member for said valve arranged to be actuated by said carrier when the same is moved to its lower position, a latch provided upon said support to hold said carrier in its lowered position, said latch having vertically spaced shoulders thereon, means operated by said main lever for moving said latch a distance sufficient to transfer its engagement with said carrier from the lower to the upper shoulder on said latch, and manually operated means for completely disengaging said latch from said carrier.

7. A gas toaster comprising a support, a burner mechanism carried by said support, a plurality of vertically extending radiant elements supported spaced from each other above said burner mechanism, a bread carrier arranged for vertical movement between said radiant elements, a main lever pivoted to said support, spring means for raising said main lever to an elevated position, a secondary lever mechanism for transmitting downward movement of said main lever to said toast carrier, spring means for raising said secondary lever and carrier to an elevated position, a gas controlling valve for said burner mechanism, spring means for closing said valve, an operating member for opening said valve arranged to be actuated by said carrier when the same is moved to its lower position, a latch provided in connection with said support to hold said carrier in its lowered position, said latch having a pair of vertically spaced shoulders formed therewith, means controlled by said main lever for moving said latch a distance sufficient to transfer its engagement with said carrier from the lower to the upper shoulder on said latch, and manually operated means for completely disengaging said latch from said carrier.

8. In a gas toaster, a support, a horizontally arranged burner carried by said support, a mixing tube provided beneath and extending parallel to said burner and communicating therewith at a point substantially midway of the length thereof, a valve casing provided with an inlet and an outlet positioned beneath said mixing tube, the outlet of said valve casing communicating with the inlet of said mixing tube, a valve positioned in said casing to control the passage of gas from the inlet to the outlet thereof, an operating member for actuating said valve, primary and secondary lever mechanisms pivotally carried by said support, a portion of said secondary lever mechanism engaging said operating member just before said lever mechanism reaches the limit of its travel in one direction, and a connection between said primary and secondary lever mechanisms whereby movement of said primary lever will cause said secondary lever to move said operating member to provide for the passage of gas through said valve casing and mixing tube to said burner.

9. In a gas toaster, a support, a horizontally arranged burner carried by said support, a mixing tube positioned beneath and extending parallel to said burner and communicating therewith at a point substantially midway of its length, a valve casing provided with an inlet and an outlet positioned beneath said mixing tube, the outlet of said valve casing communicating with said mixing tube, a valve provided in said casing to control the passage of gas from the inlet to the outlet thereof, an operating member for said valve, primary and secondary lever mechanisms pivoted to said support, a portion of the secondary lever mechanism engaging said valve operating member just before it reaches the limit of its travel in one direction, connecting means between said primary and secondary lever mechanisms whereby movement of said primary lever will cause said secondary lever to move said valve operating member to provide for the passage of gas through said valve casing and mixing tube to said burner, and means provided in connection with said support for holding said secondary lever mechanism in position to provide for sustained gas flow through said valve casing.

10. A gas toaster comprising a support, a burner mechanism carried by said support, a main lever pivoted to said support, said main lever including a pair of downwardly directed legs, a secondary lever pivoted to said support, spring means for moving said secondary lever upward, a motion transmitting connection between said levers, a toast carrier mounted for vertical movement with said secondary lever, latch means for holding said secondary lever and toast carrier in their lowermost position, a yoke member carried by the legs on said main lever, spring means connected with said yoke and support for resiliently holding the free end of said main lever in an elevated position, and means carried in connection with said yoke member and engaging said latch means to effect the release of said secondary lever when said main lever reaches its elevated position, the connection between said levers permitting said main lever to move upwardly separately from said secondary lever.

11. In a gas toaster, a support, a burner mechanism carried by said support, a spring elevated carrier movably mounted above said burner, a lever mechanism for moving said carrier to a position adjacent said burner, a gas controlling valve positioned below said burner mechanism, an operating member for said valve arranged to fully open the same when moved by said bread carrier, latch means provided upon said support for holding said carrier in engagement with said operating member, and threaded adjusting means engaging said operating member to control its degree of movement toward a valve closing position.

12. In a gas toaster, a support, a burner mechanism carried by said support, an open topped control valve casing having an inlet and outlet provided on said support, the outlet of said casing communicating with said burner mechanism, a valve member positioned within said casing for controlling the passage of gas from the inlet to the outlet thereof, a flexible metallic diaphragm closing the open top of said casing and engaging said valve, a valve operating member engaging said diaphragm, a lever mechanism pivoted to said support and engaging said valve operating member when the lever is moved in one direction, latch means for holding said lever mechanism in engagement with said operating member, and a movable carrier provided upon said lever mechanism, said mechanism moving said carrier to a position adjacent said burner when said lever mechanism is actuated to engage said valve operating member.

13. In a gas toaster, a support, a burner mechanism carried by said support, a normally elevated toast carrying mechanism arranged for vertical movement above said burner mechanism, a lever mechanism for moving said toast carrying mechanism, a gas controlling valve arranged adjacent said burner mechanism, means formed in connection with said valve for providing a partial flow of gas to said burner, an operating member for said valve to provide a full flow of gas to said burner when said operating member is engaged by said toast carrying mechanism, and means provided upon said support for holding said toast carrying mechanism in engagement with said operating member.

14. In a gas toaster, a support, a burner mechanism carried by said support, a spring elevated toast carrying mechanism arranged for vertical movement above said burner mechanism, a lever mechanism for moving said toast carrying mechanism toward said burner, spring means for returning said lever mechanism to a normal position, a gas controlling valve arranged adjacent said burner mechanism, an operating member for said gas controlling valve, said operating member moving said valve to an open position when engaged by said toast carrying mechanism, retaining means for holding said toast carrying mechanism in engagement with said valve operating member, means operated by said lever mechanism for partially releasing said retaining means to provide sufficient movement of said toast carrying mechanism to permit said valve to close, and manually operated means for completely releasing said retaining means to provide for complete elevation of said toast carrying mechanism.

15. A gas toaster comprising a support, a burner mechanism carried by said support, said burner mechanism having a plurality of spaced longitudinally extending perforated tubes united by a manifold, upwardly extending refractory walls carried by said burner tubes adjacent the perforations therein, toast carrying mechanism having portions thereof arranged for vertical movement between said refractory walls, spring means for holding said toast carrying mechanism in a normally elevated position, a lever for moving said toast carrying mechanism to a lowered position, a gas controlling valve positioned adjacent said burner mechanism, the outlet of said valve communicating with said manifold, an operating member for opening said valve when engaged by said toast carrying mechanism, a double shouldered latch for retaining said toast carrying mechanism in a lowered position, said toast carrying mechanism holding said valve in an open position when retained by the lowermost shoulder on said latch, means operated by said lever for moving said latch to cause the engagement of the second shoulder thereon with the toast carrying mechanism to permit said valve to close, and manually actuated means for disengaging said latch from said toast supporting mechanism.

16. In a gas toaster, a support, a burner carried by said support, a spring elevated toast carrying mechanism arranged for vertical movement above said burner, a lever for moving said toast carrying mechanism, a gas controlling valve connected with said burner, a valve operating member for opening said valve when engaged by said toast carrying mechanism, means for holding said toast carrying mechanism in engagement with said valve operating member, means operated by said lever for releasing said holding means, additional means for holding said toast carrying mechanism in a lowered position free from engagement with said valve operating member, and means for releasing said additional holding means.

THOMAS H. HALLWOOD.